US008907767B2

(12) United States Patent
Ozeki et al.

(10) Patent No.: US 8,907,767 B2
(45) Date of Patent: Dec. 9, 2014

(54) METHODS AND APPARATUS FOR DISTANCE DETERMINATION FOR RADIOFREQUENCY IDENTIFICATION DEVICES

(75) Inventors: Takeo Ozeki, Tokyo (JP); Yoshitaki Utsumi, Kanagawa (JP)

(73) Assignee: NCR Corporation, Duluth, GA (US)

( * ) Notice: Subject to any disclaimer, the term of this patent is extended or adjusted under 35 U.S.C. 154(b) by 1224 days.

(21) Appl. No.: 12/203,986

(22) Filed: Sep. 4, 2008

(65) Prior Publication Data
US 2010/0052857 A1 Mar. 4, 2010

(51) Int. Cl.
*H04Q 5/22* (2006.01)
*H04B 7/10* (2006.01)
*H04W 64/00* (2009.01)

(52) U.S. Cl.
CPC . *H04B 7/10* (2013.01); *H04W 64/00* (2013.01)
USPC .......................... 340/10.1; 340/10.3; 340/10.4

(58) Field of Classification Search
None
See application file for complete search history.

(56) References Cited

U.S. PATENT DOCUMENTS

| 5,157,615 | A * | 10/1992 | Brodegard et al. | 701/301 |
| 6,750,771 | B1 * | 6/2004 | Brand | 340/572.7 |
| 7,298,314 | B2 * | 11/2007 | Schantz et al. | 342/125 |
| 2005/0246094 | A1 * | 11/2005 | Moscatiello | 701/207 |
| 2005/0280504 | A1 * | 12/2005 | Pettus | 340/10.1 |
| 2006/0255919 | A1 * | 11/2006 | Doi et al. | 340/10.51 |
| 2007/0031025 | A1 * | 2/2007 | Lim et al. | 382/149 |
| 2007/0222701 | A1 * | 9/2007 | Yoon et al. | 343/895 |
| 2007/0241904 | A1 * | 10/2007 | Ozaki et al. | 340/572.1 |
| 2007/0279192 | A1 * | 12/2007 | Tanaka | 340/10.2 |
| 2007/0296586 | A1 * | 12/2007 | Mickle et al. | 340/572.1 |
| 2008/0075033 | A1 * | 3/2008 | Shattil | 370/328 |
| 2008/0143584 | A1 * | 6/2008 | Shoarinejad et al. | 342/127 |
| 2008/0180222 | A1 * | 7/2008 | Hollister et al. | 340/10.3 |
| 2008/0231420 | A1 * | 9/2008 | Koyama et al. | 340/10.1 |
| 2008/0238688 | A1 * | 10/2008 | Rofougaran et al. | 340/572.7 |

OTHER PUBLICATIONS

Kar, Two-Branch Space and Polarization Diversity Schemes for Dipoles, 2001, IEEE, p. 364.*
UPC, Antenna Array, 2006, UPC, slide 45.*

* cited by examiner

*Primary Examiner* — Mohammad Ghayour
*Assistant Examiner* — Brian Wilson
(74) *Attorney, Agent, or Firm* — Peter H. Priest

(57) ABSTRACT

Systems and techniques for reading radio frequency identification (RFID) tags and determining the distance between a reader and a tag being read. A plurality of interrogation signals are transmitted to an RFID tag, with signals at a first frequency being transmitted at a plurality of antenna polarizations and signals at a second frequency being transmitted at a plurality of antenna polarizations. The antenna polarizations are chosen such that return signals resulting from the signals and traveling along reflective paths will sum to zero. Return signals received from the tag are averaged, and phase shift information exhibited by the return signals is determined. The phase shift information for the return signals and frequency information for the interrogation signals is used to compute the distance between the reader and the tag.

17 Claims, 11 Drawing Sheets

METHODS AND APPARATUS FOR DISTANCE DETERMINATION FOR RADIOFREQUENCY IDENTIFICATION DEVICES

FIELD OF THE INVENTION

The present invention relates generally to improved reading of radio frequency identification (RFID) devices. More particularly, the invention relates to improved systems and techniques for determination of the distance between an RFID device and a reader.

BACKGROUND OF THE INVENTION

Radio frequency identification (RFID) systems are widely used for the identification and tracking of articles. An RFID tag may be affixed to an article for which tracking is desired. Examples of articles that may be tracked include an inventory item or a pallet on which inventory items are placed for storage or transport. The RFID tag may suitably include identification information, such an identification code that can be used to retrieve stored information. Alternatively, or in addition, the identification information may include actual descriptive information relating to the article. The tags are read with RFID readers, and noting the time of reading and location of the reader that is used to read a tag at a particular time may provide valuable information about the location and movement of articles.

An RFID reader reads a tag by transmitting an electromagnetic interrogation signal to the tag, and receiving a response from the tag. Depending on the design of the system, this response may be an active signal, in which the tag uses its own power source to generate a return signal, or a passive signal, in which the return signal is a reflection of the interrogation signal.

Significant advantages are achieved if an RFID reader has the capability of determining the distance to an RFID tag. Locating an article, or tracking movement of all article, is simplified by distance information. A distance measurement can be provided by interrogating a tag using two interrogation signals at different frequencies and using the frequency information and the phase difference information between the two signals to solve for distance.

However, the prevalence of reflected signals in the environment of the reader, conveniently referred to as static proximity reflected signals, tends to degrade ranging accuracy. In typical operation, the reader will encounter signals reflected from objects disposed around the reader, as well as the return signal from the tag. The objects disposed around the reader will typically be at different distances, and the phases of the reflected signals will therefore vary from one another and will also vary from the phase or phases of the return signals from the tag. The signals received by the reader will therefore include combined signals, each of which is a mixture of reflected signals and the direct signal from the tag. The signals will therefore include mixed phase information, rendering difficult or in some cases impossible the use of phase information to accurately compute distance.

Many desirable uses of a reader tend to increase the likelihood of receiving reflected signals. It is advantageous for the reader not to tightly focus the interrogation signals, because a broader focus for the signals allows for easier reading of a tag. If the signals are broadly focused, it is not necessary for a user to precisely direct an antenna at a tag. Instead, a reader may read tags that may be located at a range of angles from the reader. In addition, a broad focus allows for configurations such as a fixed tag reader detecting tags that come within range of the reader from a variety of directions. Such a configuration is particularly useful for readers that are installed at security checkpoints, because a thief trying to steal an object with an RFID tag attached is likely to attempt to avoid the signals emitted by a reader, and a broad focus for the signals makes such avoidance more difficult.

SUMMARY OF THE INVENTION

A system according to one aspect of the present invention addresses such issues, as well as others, by providing for a reader that transmits interrogation signals with multiple antenna polarizations, and uses selected data returned from these interrogation signals to compute distance between the reader and the tag. If antenna polarizations are properly chosen, the average result of the reflected signals over all polarizations will be zero, so that the average result will represent the direct signal with little or no contribution from the reflected signals. This average result can be processed to yield phase for the direct signals, and this phase information can be used to determine distance to the tag as discussed in greater detail below.

A more complete understanding of the present invention, as well as further features and advantages of the invention, will be apparent from the following Detailed Description and the accompanying drawings.

DETAILED DESCRIPTION

Figure 1:
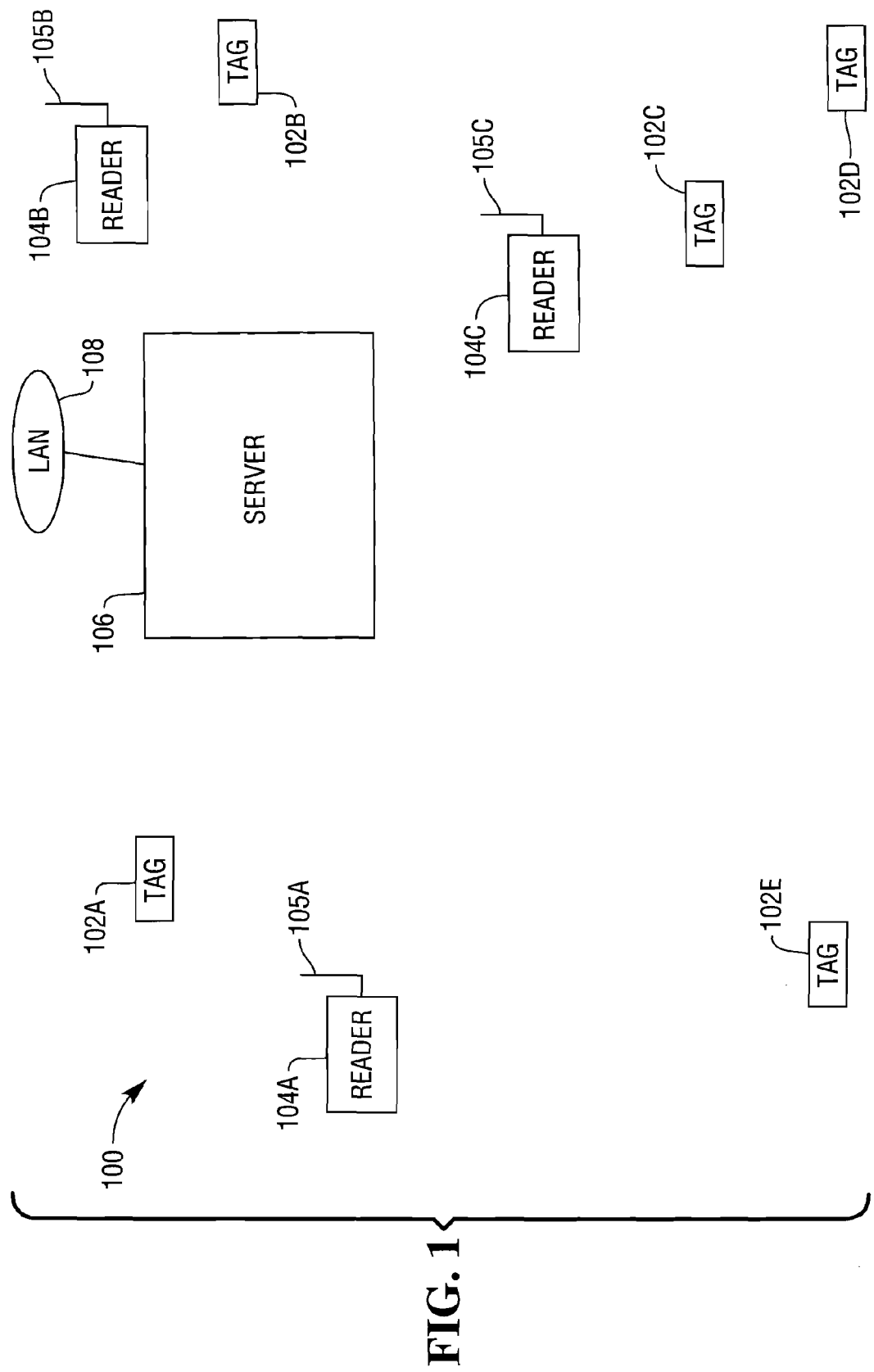
FIG. 1 illustrates an RFID system according to an aspect of the present invention.

FIG. 1 illustrates an RFID system 100 according to an aspect of the present invention. The system 100 includes a plurality of RFID tags 102A-102E, and a plurality of RFID readers 104A, 104B, and 104C, including antennas 105A, 105B, and 105C, respectively. The readers 104A-104C may suitably communicate with a server 106 over a local area network (LAN) 108, which may be a wired or wireless network, or may provide both wired and wireless access. When one of the readers is used to interrogate for the presence of an RFID tag, the reader emits interrogation signals at differing frequencies. The differing frequencies will produce differing phases, and the differing frequencies and phases of the signals returned to the reader can be used to compute the distance between the reader and a tag responding to the reader. The distance between the reader and the tag is given by the following computation:

$$d = \left(\frac{1}{2}\right)\left(\frac{c}{f_1 - f_2}\right)\left(\frac{\theta_1 - \theta_2}{2\pi}\right),$$

where c is the velocity of light.

If the signal returned to a reader from a tag follows a direct path, the phase information depends on the direct distance between the tag and the reader. However, in normal operation, numerous reflective surfaces may be present in the vicinity of a tag and a reader, so that some signals from the tag will follow a direct path to the reader, and the reader will receive other signals that have traveled along a reflected path. A reflected signal is subject to a phase and amplitude shift, so that the reflected signal may not accurately represent the distance of the reflected path. In addition, the reflected path will not represent the direct distance from the tag to the reader. A typical signal received at the reader will comprise a combination of direct and reflected signals.

In order to prevent or minimize inaccuracy and ambiguity of phase and distance information, the readers 104A-104C are suitably configured so as to generate multiple signals at multiple polarization angles for each frequency being used. Such multiple polarizations produce a variety of reflection paths for a signal traveling from a tag to a reader, and appropriate choice of polarizations reduces or eliminates the effects of contamination of the direct signal as a result of reflected signals.

Taking the reader 104A and the tag 102A as examples, the reader 104A receives a direct signal D from the tag 102A. Due to the presence of various surfaces in the vicinity of the tag 102A and the reader 104A, the reader 104A also receives various reflected signals. The reader 104A employs multiple polarizations, so that direct and multiple reflected signals are generated. The reflected signals follow different reflection paths, with the path taken by a reflected signal depending on the polarization angle of the signal. The reflected signals are suitably designated as signals $R_1$, $R_2$, $R_3$, and so on through $R_n$. The direct signal is given by $\sin\theta$, where $\theta$ is the phase of the signal, and each reflected signal in, where m=1, 2, 3, . . . , n, is given by the expression $a_m \sin(\theta + x_m)$, where $a_m$ is an amplitude shift and $x_m$ is a phase shift for the signal $R_m$, with the values of $a_m$ and $x_m$ depending on the path taken by the signal $R_m$. The signal received by the reader 104A represents a combination of the direct signals and the reflected signals, and is given by the expression $$n(\sin\theta) + \sum_{m=1}^{n} \sin(\theta + x_m),$$

which describes the direct signal and the sum of the reflected signals. For well distributed reflective paths, such as a relatively even distribution of path angles with significant separation between path angles for each path, the expression $$\sum_{m=1}^{n} \sin(\theta + x_m)$$

is approximately equal to 0, so that the total return signals represent the direct signals returned from the tag. The average of the total return signals is thus approximately equal to $\sin\theta$ and analysis of this average signal will yield the correct phase information for the signal emitted by the tag. Such a condition may be achieved by the use of a sequence of evenly spaced polarizations, and one convenient choice is a range from +67.5 degrees to −90 degrees at 22.5 degree intervals. In the present exemplary embodiment, angles of polarization are thus 67.5, 45, 22.5, 0, −22.5, −45, −67.5, and −90 degrees.

Figure 2:
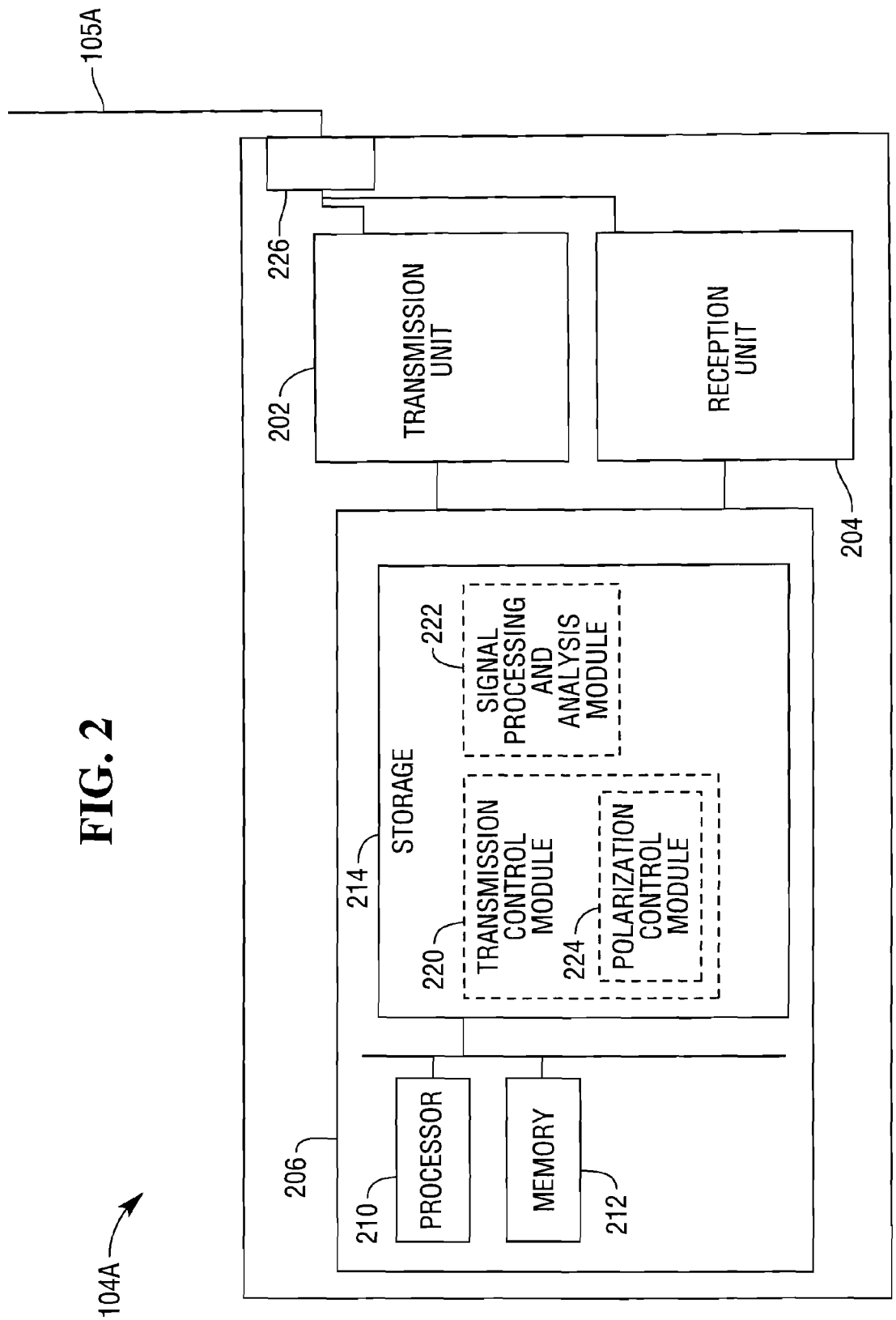
FIGS. 2-4 illustrate exemplary RFID readers according to an aspect of the present invention.

FIG. 2 illustrates additional details of the reader 104A, which is suitably similar to the readers 104B and 104C, as well as other readers having similar capabilities. The reader 104A includes a transmission unit 202, a reception unit 204, the antenna 105A, and a processing and control unit 206. The transmission unit 202 and the reception unit 204 are discussed here as separate components, but it will be recognized that the functions of the transmission and reception units 202 and 204 may be combined in a single operational unit. The processing and control unit 206 suitably includes a processor 210, memory 212, and long term storage 214. The processing and control unit 206 suitably employs a transmission control module 220, which may be implemented in the form of software hosted in the long term storage 214 and transferred to the memory 212 as needed for execution by the processor 210. The transmission control module directs transmissions to be sent by the transmission unit 202. The processing and control module 206 may further employ a signal processing and analysis module 222, also suitably implemented as software. The signal processing and analysis module 222 analyzes return signals from tags, such as the tag 102A, to recognize the presence and identity of a tag within range of the reader 104A and to compute the distance between the tag and the reader 104A.

The reader 104A performs detection of tags by transmitting one or more interrogation signals and receiving corresponding return signals from tags within range. Each return signal includes an identifier for the tag, and may include other encoded information. In addition, each return signal has characteristics that can be analyzed to provide distance information. These characteristics include frequency and phase information.

The transmission control module 220 directs transmission of interrogation signals, transferring appropriate directions to the transmission unit 202 in order to determine the characteristics of the signal to be sent. These characteristics may suitably include frequency and antenna polarization, and the transmission control module 220 suitably directs transmission of signals at each of two frequencies at a variety of predetermined polarizations, using a polarization control module 224. One technique for transmitting signals at multiple polarizations is to use a rotating mechanism such as a motor 226. When each signal is to be transmitted, the motor 226 suitably rotates the antenna 105A to an appropriate rotational position for transmitting the signal at the desired polarization.

As an alternative to sequentially transmitting signals at different frequencies at each antenna polarization, the transmission control module 220 may be configured to alternate between polarizations and frequencies, sequentially directing the transmission unit 202 to transmit an interrogation signal at each polarization at one frequency at then at each polarization at the other frequency.

When a tag, such as the tag 102A, is within range of the reader 104A, the tag receives the interrogation signals and responds by emitting return signals. If the return signals have different frequencies, the frequency and phase information for the return signals can be used to compute the distance between the reader 104A and the tag 102A returning the signals. The reception unit 204 receives return signals and transfers the return signals to the processing and control unit 206 for analysis. In the present example, analysis of the return signals is performed by the processing and control unit 206 of the reader 104A, but it will be recognized that data may be transferred to a remote processing device, such as the server 106 of FIG. 1, if desired.

When a return signal is received, the signal processing and analysis module 222 collects and stores signal data. For example, the reception unit 204 may digitize the received signal and provide the digital data to the control and processing unit 206, where it may be collected and stored, for example, in the memory 212, the long term storage 214, or both.

In order to interrogate a tag, the control and processing unit 206 directs the transmission module to transmit a plurality of interrogation signals. The transmitted interrogation signals are repetitions of base interrogation signals at each of two frequencies, with a signal at each of the two frequencies being transmitted for each of eight polarizations. The signals may be conveniently referred to as $F_{f1p1}, F_{f1p2}, \ldots, F_{f1p8}$, and $F_{f2p1}, F_{f2p2}, \ldots, F_{f2p8}$, representing signals at each of the two frequencies for each of the eight polarizations 67.5, 45, 22.5, 0, −22.5, −45, −67.5, and −90. Alternative or additional polarizations to the examples presented here may be employed. The interrogation signals $F_{f1p1}, F_{f1p2}, \ldots, F_{f1p8}$, and $F_{f2p1}, F_{f2p2}, \ldots, F_{f2p8}$ may be repeated as often as desired in order to produce a collection of return signals that may be averaged or otherwise processed to provide the needed information. As noted above, properly chosen polarizations will result in mutual cancellation of the phase shifts contributed by reflected return signals, so that the received return signals will exhibit only the phase shifts contributed by direct signals. Averaging the return signals resulting from each of the interrogation signals $F_{f1p1}, F_{f1p2}, \ldots, F_{f1p8}$ will provide a return signal $F_{R1}$, exhibiting the frequency $f_1$ and a phase shift $\theta_1$ produced by the distance between the reader 104A and the tag 102A. Averaging the return signals resulting from each of the interrogation signals $F_{f2p1}, f_{f2p2}, \ldots, F_{f2p8}$ will provide a return signal $F_{R2}$, exhibiting the frequency $f_2$ and a phase shift $\theta_2$ produced by the distance between the reader 104A and the tag 102A.

As the reception unit 204 receives each return signal, the signal is passed to the control and processing unit 206, which invokes the signal processing and analysis module 222. The signal processing and analysis module 222 performs appropriate operations to generate data representing each of the return signals resulting from the interrogation signals $F_{f1p1}, F_{f1p2}, \ldots, F_{f1p8}$ and $F_{f2p1}, F_{f2p2}, \ldots, F_{f2p8}$. As part of this processing, the module 222 extracts at least sufficient information from each return signal to identify the tag from which the signal originated. The data representing each return signal may then be processed to generate the signals $F_{R1}$ and $F_{R2}$. Multiple instances of each interrogation signal may suitably be transmitted, resulting in multiple instances of each corresponding return signal. The signals $F_{R1}$ and $F_{R2}$ are appropriate averages of all return signals for each of the corresponding frequencies.

In order to recover the signals $F_{R1}$ and $F_{R2}$, various techniques may be used to take the desired averages of the collected data, with the techniques chosen being those estimated to produce a more reliable result. Examples may include simply averaging the return signals received for interrogation signals at a particular frequency over the total number of interrogation signals for that frequency. For example, each of the signals $F_{f1p1}, F_{f1p2}, \ldots, F_{f1p8}$ may be transmitted three times, with the signal $F_{R1}$ being computed as the sum of the returns of those signals divided by 24, and each of the signals $F_{f2p1}, F_{f2p2}, \ldots, F_{f2p8}$ may be transmitted three times, with the signal $F_{R2}$ being computed as the sum of the returns of those signals divided by 24. However, exclusion of some portion of the data points according to selected criteria can be expected to improve accuracy. For example, data points associated with signals having an amplitude below a predetermined threshold may be excluded.

As noted above, the phase shift x produced by reflection introduces error into the distance measurement, and the various phase shifts $x_1, x_2, \ldots, x_n$, ideally produce an error component y that sums to 0. A combined signal produced by the direct signal and the various reflected signals from interrogation signals at differing antenna polarizations can be expressed as $\sin \theta + a \sin(\theta + x) = b \sin(\theta + y)$. As the amplitude of the received signal decreases, the combined signal error y increases. Therefore, one advantageous approach is for the signal processing and analysis module to set an amplitude threshold for reflected signals and to exclude data points representing a signal having an amplitude below this threshold.

Another advantageous approach, which may be combined with the use of an amplitude threshold, is to exclude more extreme data points as unrepresentative. For example, data points representing more extreme deviations from the mean may be discarded, such as the top 10% of data points, the bottom 10% of data points, or any desired proportion of data points. Alternative criteria for exclusion may also be used, such as excluding data points more than one or two standard deviations from the mean, or deviating from the mean by more than a predetermined threshold. Before applying such statistical techniques for exclusion, an amplitude threshold may be set and only data points exceeding the threshold allowed for consideration. Numerous approaches may be used in determining the data selection criteria. For example, during a tuning operation at for the reader 104A or a similar reader, operational tests may be performed on the reader to determine the phases of the signals produced by the reader, the amplitudes and noise levels of signals produced by the reader, and other characteristics. The reader may then suitably be programmed with appropriate data exclusion criteria.

Another alternative is to establish data exclusion criteria at installation. Appropriate signal analysis may be preformed to determine characteristics of received signals in the presence of obstruction, reflectivity, and other features of the environment, with data exclusion criteria being based on the detected signal characteristics. Such selection of data exclusion criteria may be periodically updated as desired, to account for changes that may take place in the operation environment.

In addition, or as a further alternative, a reader such as the reader 104A may undergo an automated learning operation, during which interrogations are made to tags at known distances. The signal processing and analysis module 222 receives distance information for the tag to be interrogated. This distance information may be entered by an operator, for example. A number of interrogations are performed, and the signal processing and analysis module examines the data in light of the known distance information and determines criteria for exclusion based on a need for the estimated distance information to conform to the known distance information.

Once proper exclusion of data points has been accomplished, the signal processing and analysis module 222 takes appropriate averages and reconstructs the signals $F_{R1}$ and $F_{R2}$. As noted above, appropriate polarization choices for the interrogation signals result in return signals whose reflected components sum to zero. Therefore, the return signals may be expressed as $F_{R1} = \sin \theta_1$ and $F_{R2} = \sin \theta_2$. The frequencies of the sine waves represented by the signals $F_{R1}$ and $F_{R2}$ are the respective phase shifts resulting from the reflections of the interrogation signals from the tag 102A. The signal processing and analysis module 222 performs an inverse sine function on each of the signals $F_{R1}$ and $F_{R2}$ to recover the values $\theta_1$ and $\theta_2$. These values are passed to a range computation module 224, which uses the values $\theta_1$ and $\theta_2$ in the computation $$d = \left(\frac{1}{2}\right)\left(\frac{c}{f_1 - f_2}\right)\left(\frac{\theta_1 - \theta_2}{2\pi}\right).$$

The values $f_1$ and $f_2$ are the frequencies used for the interrogation signals. The value for d is returned to the signal processing and analysis module 222.

In addition to extracting the phase information from the return signals, the signal processing and analysis module 222 also demodulates one or more of the return signals to extract tag information. As noted above, this may include a tag identifier or more detailed information. Such detailed information may include a description of the goods or container to which the tag is affixed or other desired information and may also include information programmed into the tag 102A while the tag 102A and associated goods or containers are being stored or transported. Such information may be written to the tag 102A by the reader 104 and similar readers. If desired, the reader 104 may write distance information to the tag 102A. For example, if the tag 102A is to be tracked while it is transported past fixed readers, the reader's recognition of the tag 102A, plus the distance from the reader to the tag 102A, may be written to the tag. In addition or as an alternative, tag information and events associated with the tag information, including distance information, may be stored locally at the reader 104A, communicated to the server 106, or otherwise managed as desired. Computing the distance to articles may also be useful in connection with a mobile reader. For example, knowing the distance to a tag may significantly aid in locating the tag, and thus the article to which the tag is affixed. If an operator is informed that a tag has been located and is approximately 7 feet away, the operator knows the approximate area that should be searched for the tag. In cases in which the location of a reader is identified or tracked by noting fixed tags encountered by the reader, the reader's distance from the tag may significantly enhance location or tracking of the reader.

It will be recognized that the readers 104B and 104C, as well as additional readers that may be deployed, may be configured to perform distance computations using the same techniques described here with respect to the reader 104A, and may be similarly configured to the reader 104A.

Figure 3:
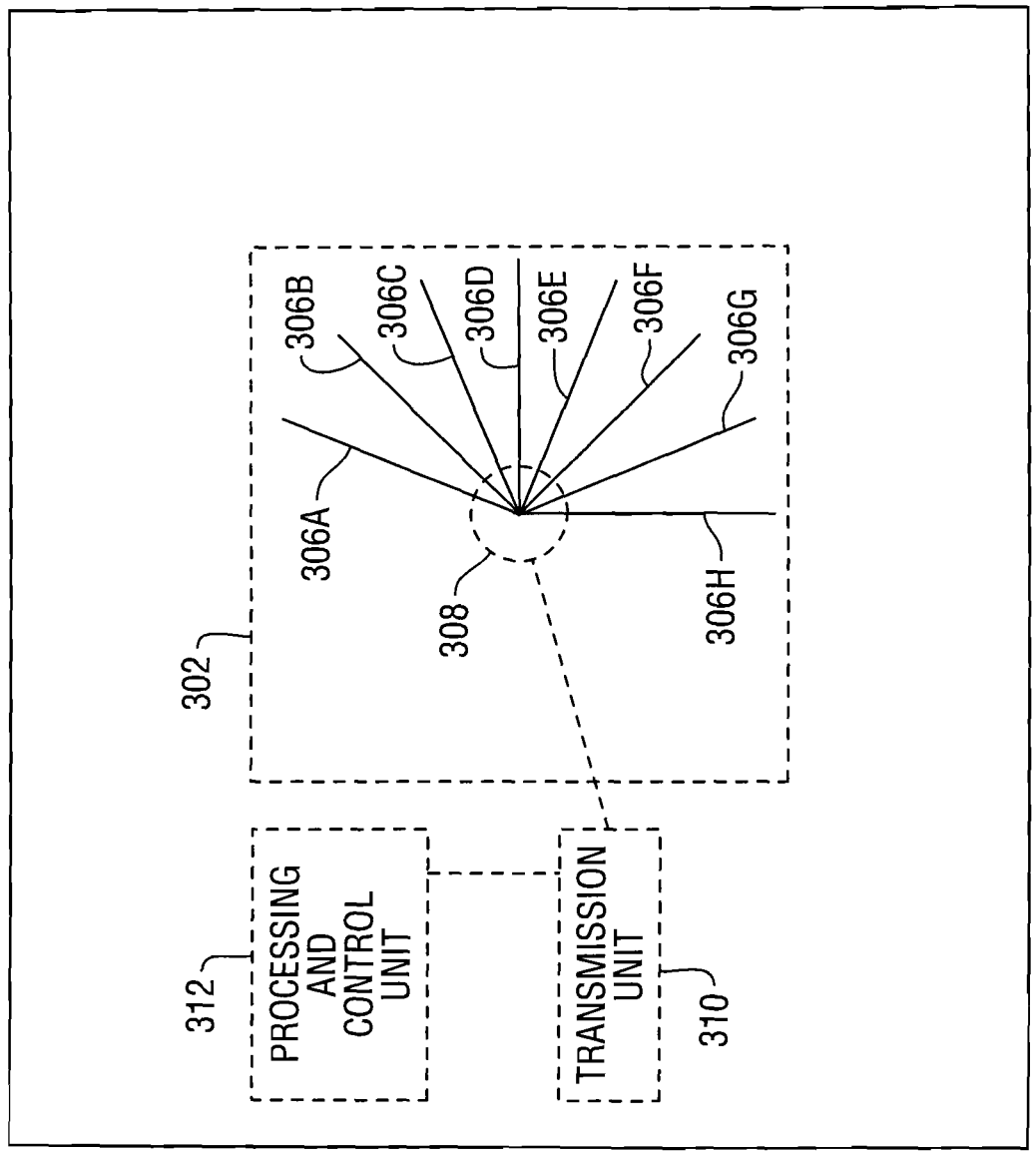

Additional mechanisms may be used for selection of antenna polarization. One such mechanism is to employ a reader with multiple antenna elements arrayed at appropriate angular directions. FIG. 3 illustrates a front view of a reader 300, employing an antenna 302 with multiple antenna elements 306A-306H, arranged at angles of 67.5, 45, 22.5, 0, −22.5, −45, −67.5, and −90 degrees, respectively. The antenna element used for transmission at any particular time may be chosen by a selection mechanism, such as a switching mechanism 308, which may be controlled by a transmission unit 310, with the transmission unit 310 being directed as to which signal to send and which antenna element to select by a processing and control unit 312.

Figure 4:
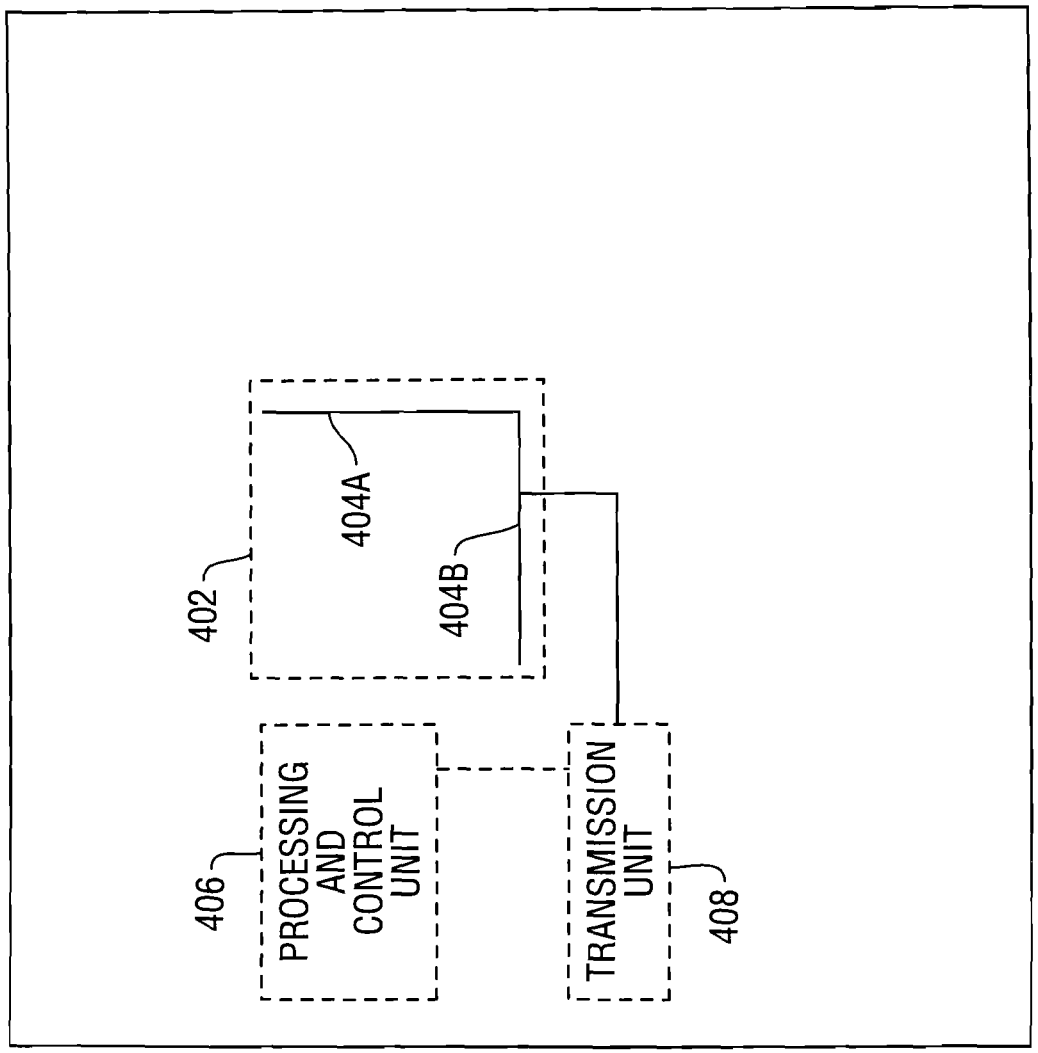

FIG. 4 illustrates a reader 400, employing a further mechanism for selection of antenna polarization. The reader 400 employs an antenna 402, with antenna elements 404A and 404B. The antenna elements 404A and 404B are disposed at right angles to one another. The reader 400 employs a processing and control unit 406, choosing appropriate interrogation signals to be transmitted and processing received return signals. The processing and control unit 406 controls the operation of a transmission unit 408. The transmission unit 408 injects signals to be transmitted by the antenna elements 404A and 404B. The transmission unit 408 is capable of injecting signals of differing phase and amplitude to the antenna elements 404A and 404B. Proper selection of the phase and amplitude injected to each element produces an effective signal of desired polarization transmitted by the antenna 402. Such a configuration allows for simple achievement of certain polarization angles. For example, a polarization angle of 0 degrees can be achieved by transmitting using only the element 404A, a polarization angle of −90 degrees can be achieved by transmitting using only the element 404B, and a polarization angle of −45 degrees can be achieved by transmitting using the elements 404A and 404B with attenuation. As discussed below in greater detail, significant improvements in accuracy can be achieved through the use of polarization diversity using three polarization angles, as compared to ranging without the use of polarization diversity.

Figure 5:
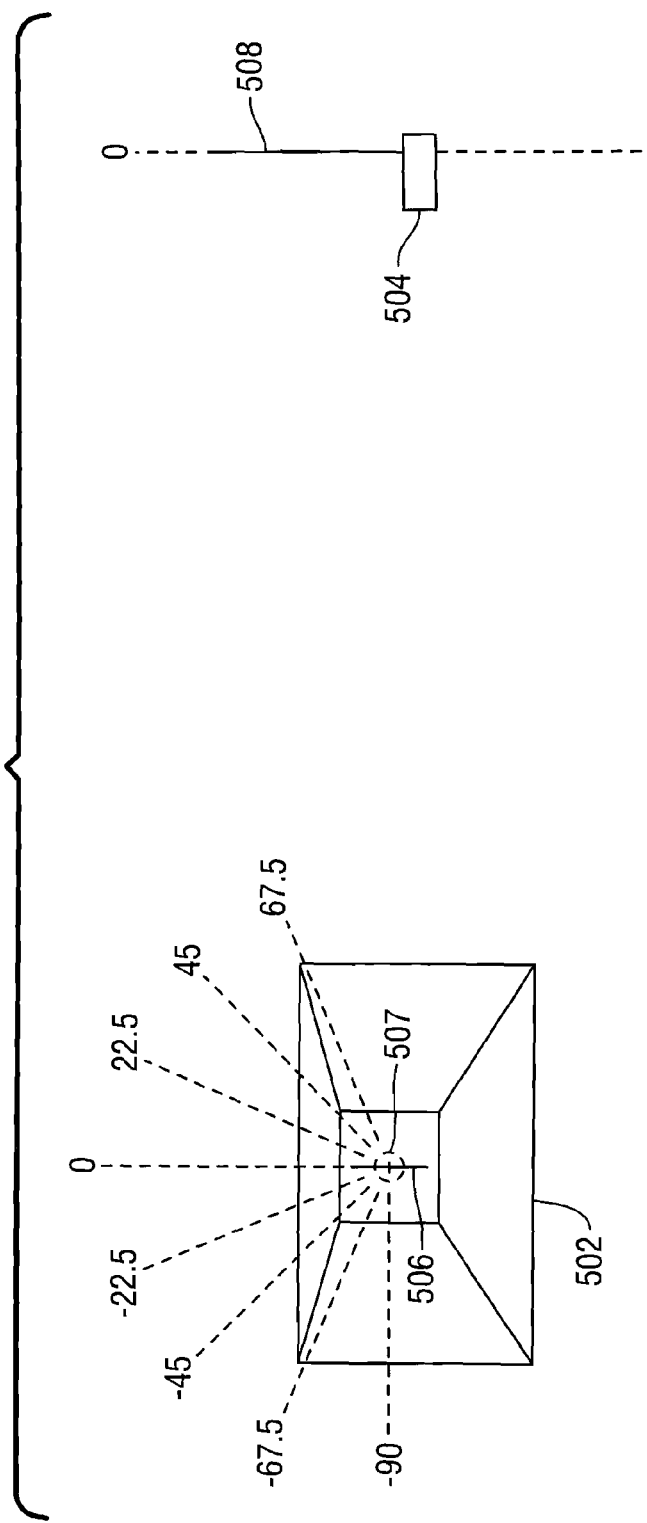
FIG. 5 illustrates an RFID reader and tag according to an aspect of the present invention, showing an exemplary set of antenna polarizations.

FIG. 5 illustrates an exemplary reader 502 and tag 504, showing illustrative antenna polarizations. The reader 502 may include a variable polarization antenna 506, which may be implemented as described as discussed above in connection with any of FIGS. 2-4, or using other suitable mechanisms for implementing multiple polarization. In the example illustrated here, the antenna 506 may suitably be a fixed dipole antenna, rotated to an appropriate position for the selected polarization by a rotation mechanism 507. The tag 504 includes an antenna 508. The antenna 508 may suitably be a fixed dipole antenna with a polarization of 0 degrees.

The reader 502 is configured so that the variable polarization antenna 506 takes on polarizations of 67.5, 45, 22.5, 0, −22.5, −45, −67.5, and −90 degrees. These varying polarities result in varying reflective paths for return signals that are not returned directly from the tag 504.

Figure 6:
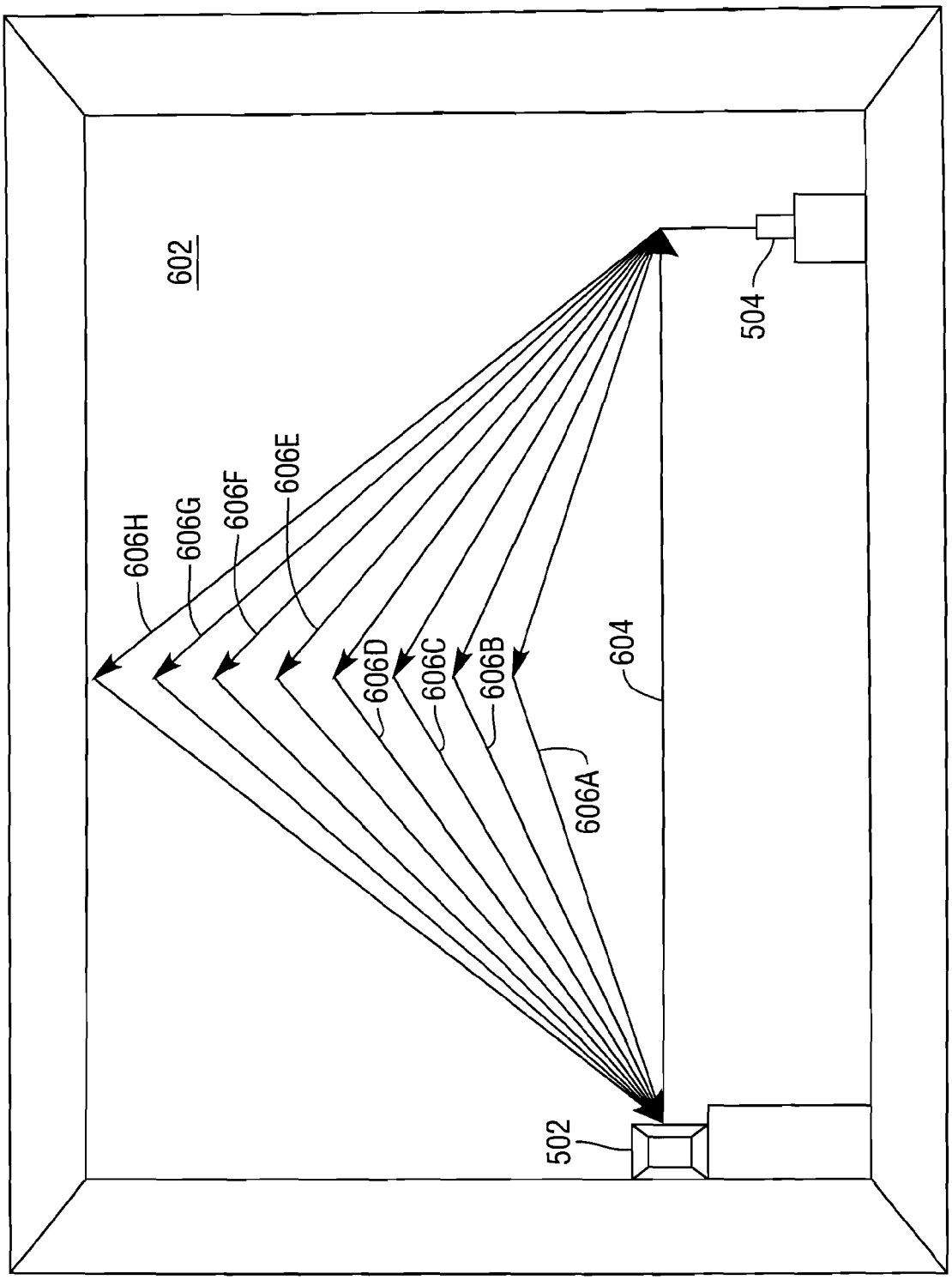
FIG. 6 illustrates an RFID reader and tag according to an aspect of the present invention, illustrating an exemplary set of return signals traveling between the tag and the reader.

FIG. 6 illustrates the reader 502 and tag 504, deployed in a room having a back wall 602. A direct return signal 604 is transmitted from the tag 504 to the reader 502, and return signals 606A-606H are also transmitted, with the return signals 606A-606H resulting from interrogation signals exhibiting different antenna polarizations. Because of the varying polarizations used for the interrogation signals that produce the return signals, the different return signals 606A-606H have different reflection paths and different reflection distances. As discussed above with respect to FIGS. 1 and 2, the phase shifts exhibited by these different signals 606A-606H sum to zero if appropriate antenna polarizations are chosen.

Figure 7:
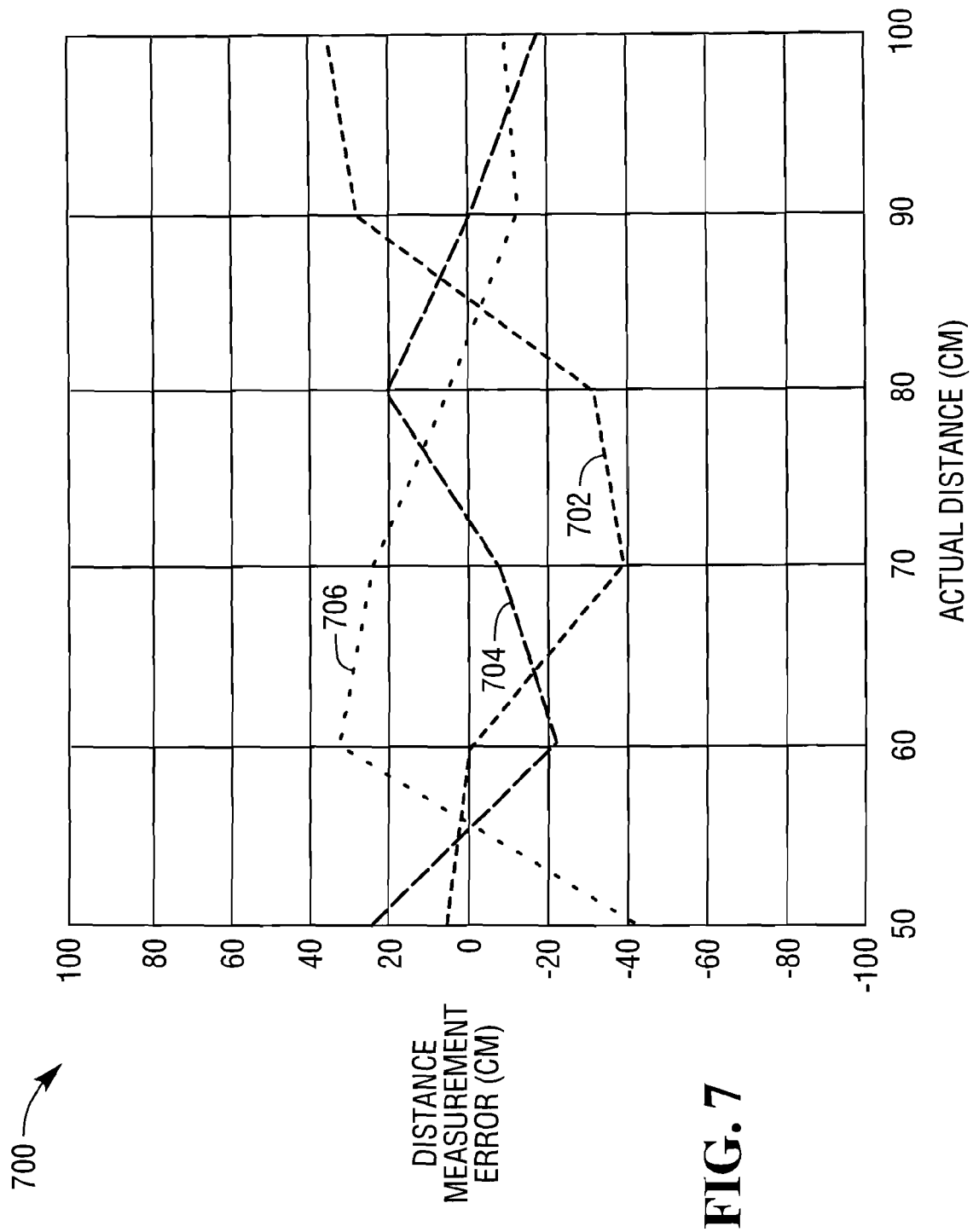
FIGS. 7-9 illustrate a graph of a set of experimental results for distance measurements made according to an aspect of the present invention under a variety of conditions.

FIG. 7 illustrates a graph 700 showing distance measurement errors for measurement attempts at different distances and using different frequency bands. Eight polarization angles were used, namely 67.5, 45, 22.5, 0, −22.5, −45, −67.5, and −90 degrees, and measurements were conducted and results compiled for the U.S., European, and Japanese frequency bands that are reserved for RIFD operations. The U.S. band for RFID operations ranges from 902 megahertz (MHz) to 928 MHz, the European frequency band for RFID operations ranges from 865.6 to 867.6 MHz, and the Japanese frequency band for RFID operations ranges from 952 to 954 MHz. Three interrogation signals at each polarization angle were used for each distance measured. An amplitude threshold of 35 microvolts (35 μV) was used, the 30% of data points on either side of the mean exhibiting the greatest deviation were eliminated. The curve 702 illustrates the results for the U.S. frequency band, the curve 704 illustrates the results for the European frequency band, and the curve 706 illustrates the results for the Japanese frequency band. Relevant statistics for the measurements are as follows:

| Band | United States | Europe | Japan |
|---|---|---|---|
| Max error+ (cm) | 35.09 | 25.05 | 32.47 |
| Max error− (cm) | −38.36 | −20.97 | −41.42 |
| Error range (cm) | 73.45 | 46.02 | 73.89 |
| Standard deviation | 30.21 | 19.19 | 26.88 |

Figure 8:
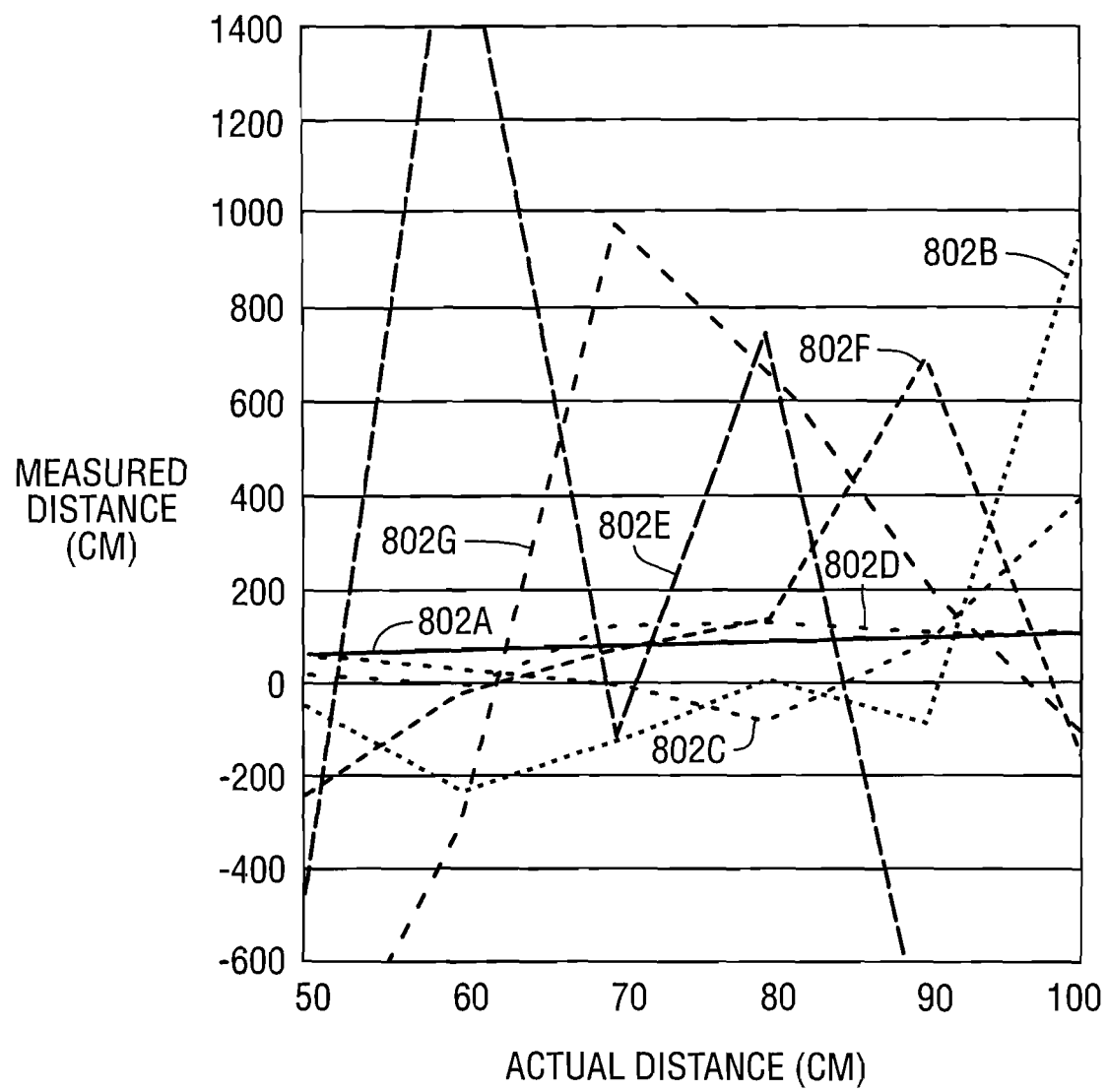

Experimental results demonstrate the advantages of the use of polarization diversity in RFID distance measurement, as can be seen by comparing distance measurement results without the use of polarization diversity against results achieved using polarization diversity. FIG. 8 illustrates a graph 800 showing distance measurements taken with worst case tag orientation angles using a Yagi unidirectional antenna for a first set of measurements and a selected EMCO brand antenna for a second set of measurements over the same distances and under similar circumstances. Each set of measurements is taken over selected differences, and using the European, U.S., and Japanese frequency bands for experiments using each antenna. Polarization diversity was not used. The curve 802A illustrates known reference distances, and the curves 802B and 802C represent results with a Yagi antenna and an EMCO brand antenna, respectively, using the European frequency band, the curves 802D and 802E represent results with a Yagi antenna and an EMCO brand antenna, respectively, using the U.S. frequency band and the curves 802F and 802G represent results with a Yagi antenna and an EMCO brand antenna, respectively, using the Japanese frequency band. For the Yagi antenna, an amplitude threshold of 40 uVrms was used, with the 10% of data points showing the greatest deviation excluded, and for the EMCO brand antenna, an amplitude threshold of 30 uVrms was used, with the 30% of data points showing the greatest deviation being excluded. It can be seen that the distance measurements exhibit wide deviation from the known reference measurements, with characteristics as follows:

| Band | United States | Europe | Japan |
|---|---|---|---|
| Yagi | | | |
| Max error+ (cm) | 49.9 | 850.2 | 597.4 |
| Max error− (cm) | −74.3 | −291.2 | −295.9 |
| Error range (cm) | 124.2 | 1141.4 | 893.3 |
| Standard deviation | 48.2 | 423.7 | 325.9 |
| EMCO | | | |
| Max error+ (cm) | 1693.1 | 289.0 | 909.0 |
| Max error− (cm) | −904.6 | −166.9 | −1009.7 |
| Error range (cm) | 2597.7 | 455.9 | 1918.7 |
| Standard deviation | 998.2 | 154.8 | 690.6 |

Figure 9:
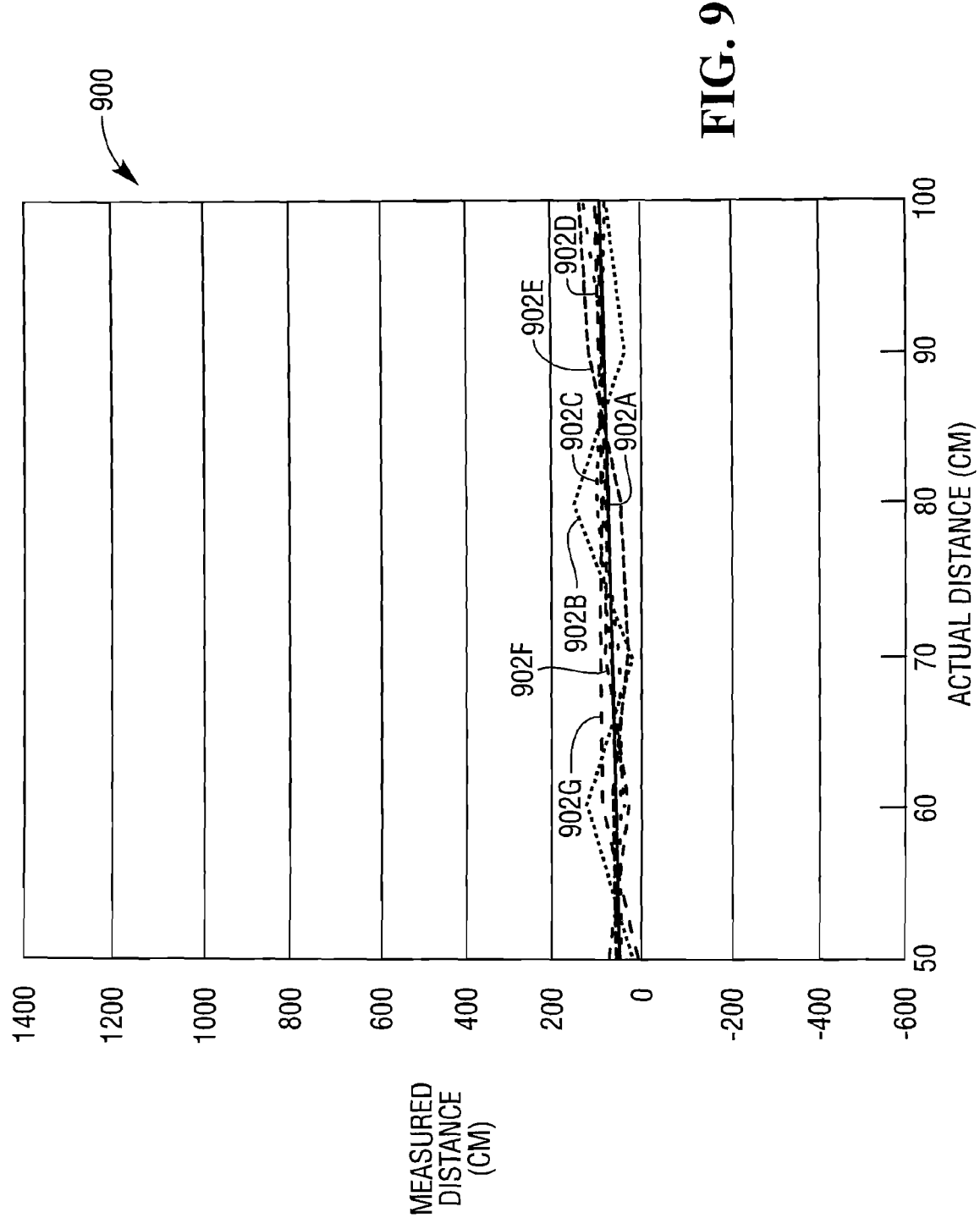

FIG. 9 illustrates measurements taken under the same circumstances, using a Yagi antenna and an EMCO brand antenna with the same data selection criteria and using the same frequency bands. The curve 902A illustrates known reference distances, while the curves 902B and 902C represent results with a Yagi antenna and an EMCO brand antenna, respectively, using the European frequency band, the curves 902D and 902E represent results with a Yagi antenna and an EMCO brand antenna, respectively, using the U.S. frequency band, and the curves 902F and 902G represent results with a Yagi antenna and an EMCO brand antenna, respectively, using the Japanese frequency band. It can be seen that the distance measurements much closer conformity to the known reference measurements, with characteristics as follows:

| Band | United States | Europe | Japan |
|---|---|---|---|
| Yagi | | | |
| Max error+ (cm) | 25.8 | 70.9 | 19.8 |
| Max error− (cm) | −22.4 | −47.4 | −25.2 |
| Error range (cm) | 48.2 | 118.3 | 45.0 |
| Standard deviation | 17.1 | 53.6 | 14.8 |
| EMCO | | | |
| Max error+ (cm) | 35.1 | 25.0 | 32.5 |
| Max error− (cm) | −38.4 | −21.0 | −41.4 |
| Error range (cm) | 73.5 | 46.0 | 73.9 |
| Standard deviation | 30.2 | 19.2 | 26.9 |

Figure 10:
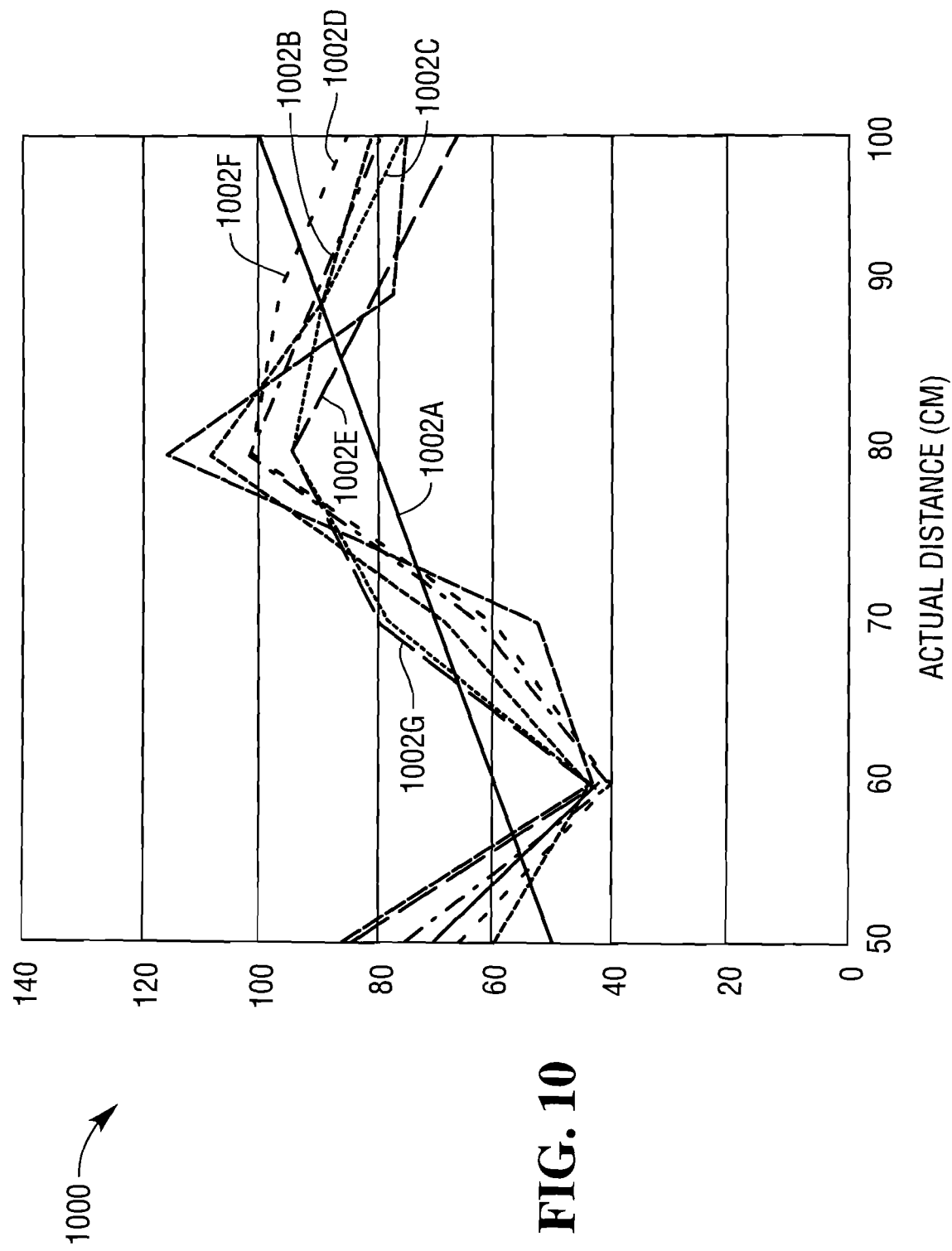
FIG. 10 illustrates a graph of a set of experimental results for distance measurements made using different numbers of polarization angles.

Eight polarization angles are used in the examples above, but fewer polarizations angles can be used while still achieving significant improvements over distance measurement without polarization diversity. The use of fewer polarization angles reduces transmission complexity and reduces the number of signals that must be received and processed. FIG. 10 illustrates a graph 1000, showing a reference curve 1002A and measurement curves 1002B-1002G, for an EMCO brand antenna using the European frequency band, with a threshold of 30 uVrms and exclusion of 30% of extreme data samples at each side. The curve 1002B represents distance measurements performed using 8 polarization angles −90, −67.5, −25, −22.5, 0, 22.5, 45, and 67.5 degrees. The curve 1002C represents distance measurements performed using 5 polarization angles −90, −67.5, −45, −22.5, and 0 degrees, and the curves 1002D-1002G represent distance measurements performed using 3 polarization angles, with the curve 1002D representing measurements performed using polarization angles −22.5, 22.5, and 67.5 degrees, the curve 1002E representing measurements performed using polarization angles −67.5, −22.5, and 22.5 degrees, the curve 1002F representing measurements performed using polarization angles −45, 0, and 45 degrees, and the curve 1002G representing measurements performed using polarization angles −90, −45, and 0 degrees. Results for the set of measurements may be summarized as follows:

| | 8 Angles | 5 Angles | 3 Angles |
|---|---|---|---|
| Max error+ (cm) | 25.9 | 20.8 | 36.9 |
| Max error− (cm) | −21.1 | −25.1 | −34.0 |
| Error range (cm) | 47.0 | 45.9 | 70.9 |
| Standard deviation | 20.2 | 18.1 | 21.1 |

It can be seen that in the present example, the use of 5 angles yields results similar to the use of 8 angles, and that the error produced by the use of 3 angles, while significantly greater, is much less than without the use of polarization diversity.

Figure 11:
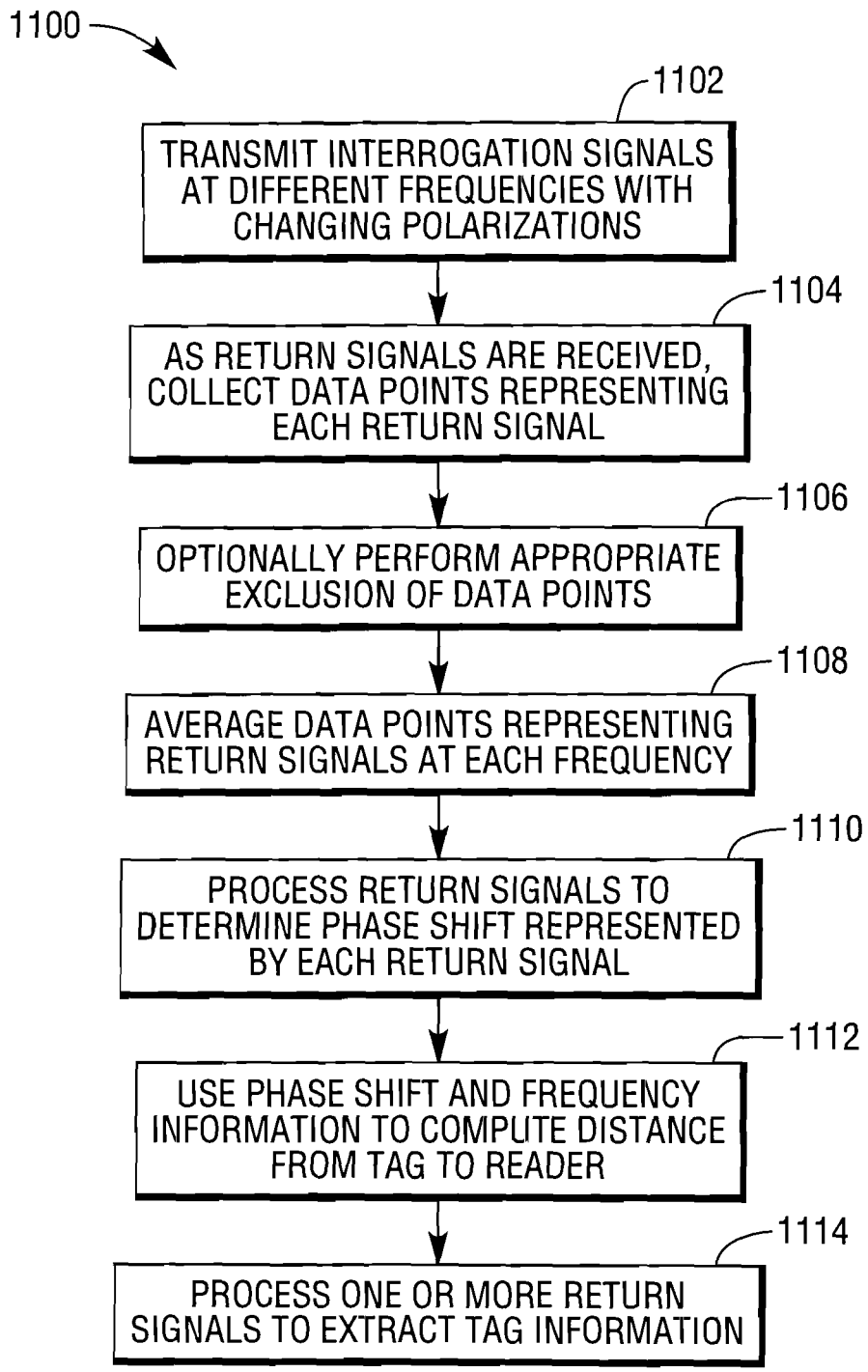
FIG. 11 illustrates a process of RFID tag detection and distance determination according to an aspect of the present invention.

FIG. 11 illustrates the steps of a process 1100 of reading an RFID tag and computing the distance thereto. At step 1102, a sequence of interrogation signals are transmitted by a reader, such as the reader 104A of FIGS. 1 and 2. Interrogation signals at two different frequencies are used and signals at each frequency are transmitted at a plurality of predetermined antenna polarizations. The polarizations are chosen so that the return signals resulting from the interrogation signals, which are reflected from surfaces in the vicinity of the tag rather than received directly from the tag, will sum to zero.

For example, interrogation signals may be transmitted at polarizations of 67.5, 45, 22.5, 0, −22.5, −45, −67.5, and −90 degrees. Smaller numbers of polarization angles, such as five polarization angles or three polarization angles may also be used. At step 1104, as return signals representing responses by the tag to the interrogation signals are received, data points representing the return signal generated by each interrogation signal are collected. Suitably, processing is performed on the return signals so as to extract tag identification information in order to confirm that all return signals under consideration originated from the same tag.

At optional step 1106, exclusion of data points according to suitable criteria, such as predetermined criteria, is performed. Data points may, for example, be excluded if they fail to meet an amplitude threshold, or data points meeting suitable criteria for deviation from a mean may be excluded, such as excluding the 10% of data points exhibiting the greatest deviation from the mean.

At step 1108, the data points representing return signals at each frequency are averaged. The averaged signals will represent return signals produced by interrogation signals at each frequency. At step 1110, the ret signals are processed to determine the phase shift represented by each return signal. For example, if each return signal represents a sine wave whose frequency is the phase shift of the return signal, the inverse sine of the signal may be computed in order to determine the phase shift.

At step 1112, the phase shift information associated with the return signals and the known frequency information for the interrogation signals are used to compute the distance between the reader and the tag. At step 1114, one or more of the return signals from the tag are processed to extract information stored in the tag and the information is used as desired.

While the present invention is disclosed in the context of a presently preferred embodiment, it will be recognized that a wide variety of implementations may be employed by persons of ordinary skill in the art consistent with the above discussion and the claims which follow below.

We claim:

1. A radio frequency identification (RFID) reader, comprising:
    a transmission unit for transmitting a plurality of interrogation signals;
    a reception unit for receiving return signals produced from an RFID tag responding to the plurality of interrogation signals, wherein the return signals comprise both return signals traveling along direct paths from the RFID tag and return signals traveling along reflective paths from the RFID tag; and
    a control and processing unit for controlling the transmission unit to transmit the plurality of interrogation signals and processing the return signals received from the RFID tag to identify the RFID tag and compute the distance between the RFID reader and the RFID tag, the control and processing unit being operative to direct the transmission unit to transmit the plurality of interrogation signals such that they exhibit varying antenna polarizations, the antenna polarizations being chosen such that the return signals produced from the RFID tag responding to the plurality of interrogation signals and traveling along the reflective paths from the RFID tag to the RFID reader will sum to approximately zero, wherein each return signal received from the RFID tag includes tag information comprising an identifier for the RFID tag, and wherein the control and processing unit discards a preconfigured top percentage and a preconfigured bottom percentage of the return signals from a mean of the return signals when computing the distance between the RFID reader and the RFID tag.

2. The reader of claim 1, wherein the control and processing unit directs the transmission unit to transmit the plurality of interrogation signals such that they exhibit at least a first frequency and a second frequency and wherein the control and processing unit is further operative to collect data representing the return signals from the RFID tag and analyze the data to determine phase shifts exhibited by the return signals and to use the determined phase shifts from the return signals and the first and second frequency from the plurality of interrogation signals when computing the distance between the RFID tag and the RFID reader.

3. The reader of claim 2, wherein the control and processing unit directs the transmission unit to transmit the plurality of interrogation signals at the plurality of antenna polarizations at the first frequency, and to transmit the plurality of interrogation signals at the same respective antenna polarizations at the second frequency.

4. The reader of claim 3, wherein the control and processing further excludes return signals having an amplitude below an amplitude threshold.

5. The reader of claim 2, wherein the antenna polarizations alternate over a sequence of angular positions including an initial position, a terminal position, and one or more positions evenly spaced between the initial and terminal positions.

6. The reader of claim 2, wherein the antenna polarizations alternate over a sequence of at least five angular positions.

7. The reader of claim 1, wherein one of the return signals is demodulated to extract the identifier of the RFID tag.

8. The reader of claim 1, wherein the tag information further comprises a description of goods to which the RFID tag is attached.

9. The reader of claim 1, wherein processing is performed on the return signals to extract tag information which is utilized to confirm that all the return signals originated from the RFID tag.

10. The reader of claim 1, wherein the determined distance between the RFID reader and the RFID tag is written to the RFID tag by the RFID reader.

11. A method of determining the distance between a radio frequency identification (RFID) tag and an RFID reader, comprising:
    transmitting a plurality of interrogation signals at a first and at a second frequency, the plurality of interrogation signals at the first frequency and at the second frequency being transmitted at a plurality of antenna polarizations, the plurality of antenna polarizations being chosen such that return signals produced by the RFID tag responding to the plurality of interrogation signals and traveling along reflective paths from the RFID tag to the RFID reader will sum to approximately zero;
    receiving the return signals, where each return signal includes tag information comprising an identification of the RFID tag, from the RFID tag, and wherein the return signals comprise both return signals traveling along direct paths from the RFID tag and the return signals traveling along the reflective paths from the RFID tag;
    processing the return signals to identify the RFID tag and to determine phase shift information comprising a phase shift exhibited by each of the return signals at the first frequency and a phase shift exhibited by each of the return signals at the second frequency;
    discarding a preconfigured top percentage and a preconfigured bottom percentage of the return signals from a mean of the return signals when determining the distance between the RFID tag and the RFID reader; and using the phase shift information and the first frequency and the second frequency of the plurality of interrogation signals when determining the distance between the RFID tag and the RFID reader.

12. The method of claim 11, wherein the plurality of antenna polarizations at the first frequency are the same as the plurality of antenna polarizations at the second frequency.

13. The method of claim 11, wherein when determining the distance between the RFID tag and the RFID reader includes taking an average of the return signals which were not discarded during the discarding step.

14. The method of claim 13, wherein the step of discarding the return signals includes excluding a portion of the return signals from consideration according to a predetermined criteria, applied as part of an automated learning operation during which a plurality of second interrogations are made to RFID tags at known distances.

15. The method of claim 13, wherein the return signals below a specified amplitude threshold are also discarded during the discarding step.

16. The method of claim 11, wherein the plurality of antenna polarizations alternate over a sequence of angular positions including an initial position, a terminal position, and one or more positions evenly spaced between the initial and terminal positions.

17. The method of claim 12, wherein the plurality of antenna polarizations alternate over a sequence of at least five angular positions.

* * * * *